United States Patent [19]

Dalziel et al.

[11] Patent Number: 4,636,902
[45] Date of Patent: Jan. 13, 1987

[54] CROSSTALK SHIELDING ASSEMBLY FOR ADDITION TO ONE HEAD OF A DUAL MAGNETIC HEAD ASSEMBLY

[75] Inventors: Warren L. Dalziel, Monte Sereno; Charles Flanigan, San Jose; Donald V. Daniels, Santa Cruz; John S. Lee, San Jose; James Johnston, Morgan Hill, all of Calif.

[73] Assignee: Microtek Storage Corporation, San Jose, Calif.

[21] Appl. No.: 629,122

[22] Filed: Jul. 9, 1984

[51] Int. Cl.⁴ ............................. G11B 5/11; G11B 5/22
[52] U.S. Cl. .................................... 360/128; 360/122; 360/129
[58] Field of Search ..................... 360/128, 129, 122

[56] References Cited

U.S. PATENT DOCUMENTS

| | | | |
|---|---|---|---|
| 2,769,036 | 10/1956 | Selsted | 360/129 |
| 3,026,379 | 3/1962 | Carpenter | 360/122 |
| 3,234,338 | 2/1966 | Foster et al. | 360/129 |
| 3,610,839 | 10/1971 | Sand | 360/129 |
| 3,700,828 | 10/1972 | Zacaroli | 360/128 |
| 4,527,212 | 7/1985 | Richards | 360/129 |

OTHER PUBLICATIONS

Albrecht et al, "Shield . . . Assembly", IBM Tech. Disc. Bull., vol. 16, No. 12, May 1974, p. 4057.

Primary Examiner—Robert S. Tupper
Attorney, Agent, or Firm—Bogucki, Scherlacher, Mok & Roth

[57] ABSTRACT

A dual magnetic head assembly is provided with asymmetrical crosstalk shielding. One of the heads includes a pair of mu-metal washers sandwiching a copper washer, the stacked washers surrounding the portion of the head including the read-write gap. The washers are enclosed within a copper plated mu-metal cap having a central opening through which the gap-containing portion of the head projects for cooperation with a magnetic medium. The other head is unshielded.

9 Claims, 2 Drawing Figures

CROSSTALK SHIELDING ASSEMBLY FOR ADDITION TO ONE HEAD OF A DUAL MAGNETIC HEAD ASSEMBLY

FIELD OF THE INVENTION

The present invention pertains generally to magnetic recording and reproducing apparatus and particularly to the elimination of crosstalk between dual read/write heads employed in such apparatus.

BACKGROUND OF THE INVENTION

In magnetic recording and reproducing, a magnetic storage medium typically in the form of a disk or tape is moved across a magnetic head or transducer assembly which interacts with the medium to write or read stored information such as digital data. Recording of the stored data is effected by current reversals through the windings of the write head while reproduction of the data is accomplished when a voltage is induced in the windings of the read head when a flux reversal traverses the gap of that head. These operations generate spray magnetic fields or leakage flux about the magnetic heads and particularly so when the rise times of the data pulses are short.

Some magnetic storage devices incorporate two magnetic heads either of which can be selected for reading or writing. An example is the streaming magnetic tape drive disclosed in application Ser. No. 386,048, filed June 7, 1982 and entitled "Magnetic Data Storage And Drive Apparatus", which application issued on Oct. 16, 1984 as U.S. Pat. No. 4,477,851 and is commonly assigned with the present application. In that drive, the heads are mounted side-by-side along the direction of tape movement with a close spacing between head gaps, for example, of the order of 0.6 to 0.7 inch (1.5–1.8 cm). By using dual read/write heads having essentially the same read, write and erase characteristics, a bidirectional read-after-write function with error detection is made possible. As a result of leakage flux, however, excessive "crosstalk" between the closely adjacent heads can occur during read-after-write operations.

SUMMARY OF THE INVENTION

In accordance with the broader aspects of the present invention, only one of the heads is provided with shielding. Such asymmetric shielding has been determined to be substantially more effective in reducing crosstalk than symmetric shielding schemes of the prior art. Moreover, the shielding elements in accordance with another aspect of the invention are so structured and integrated into the head assembly that the external configuration of the two heads remain identical so that their mechanical interaction with the magnetic medium is essentially the same.

A preferred specific embodiment of the invention includes a pair of identically-shaped button or spherical head assemblies mounted side-by-side for interaction with a single track along a multi-track magnetic tape. Each head includes a transducer with a read/write gap, either head being selectable for read/write operation so as to provide a bidirectional, read-after-write, error checking function. One of the heads includes a pair of mu-metal washers sandwiching a copper washer, the stacked washers being disposed about the transducer of the head assembly. The washers are enclosed within a copper plated mu-metal cap which has a central opening through which the face of the transducer projects. The other head remains unshielded.

BRIEF DESCRIPTION OF THE DRAWINGS

Further advantages and features of the present invention will be readily apparent from the ensuing detailed description when taken in conjunction with the accompanying drawings in which.

DETAILED DESCRIPTION OF A PREFERRED EMBODIMENT

Figure 1:
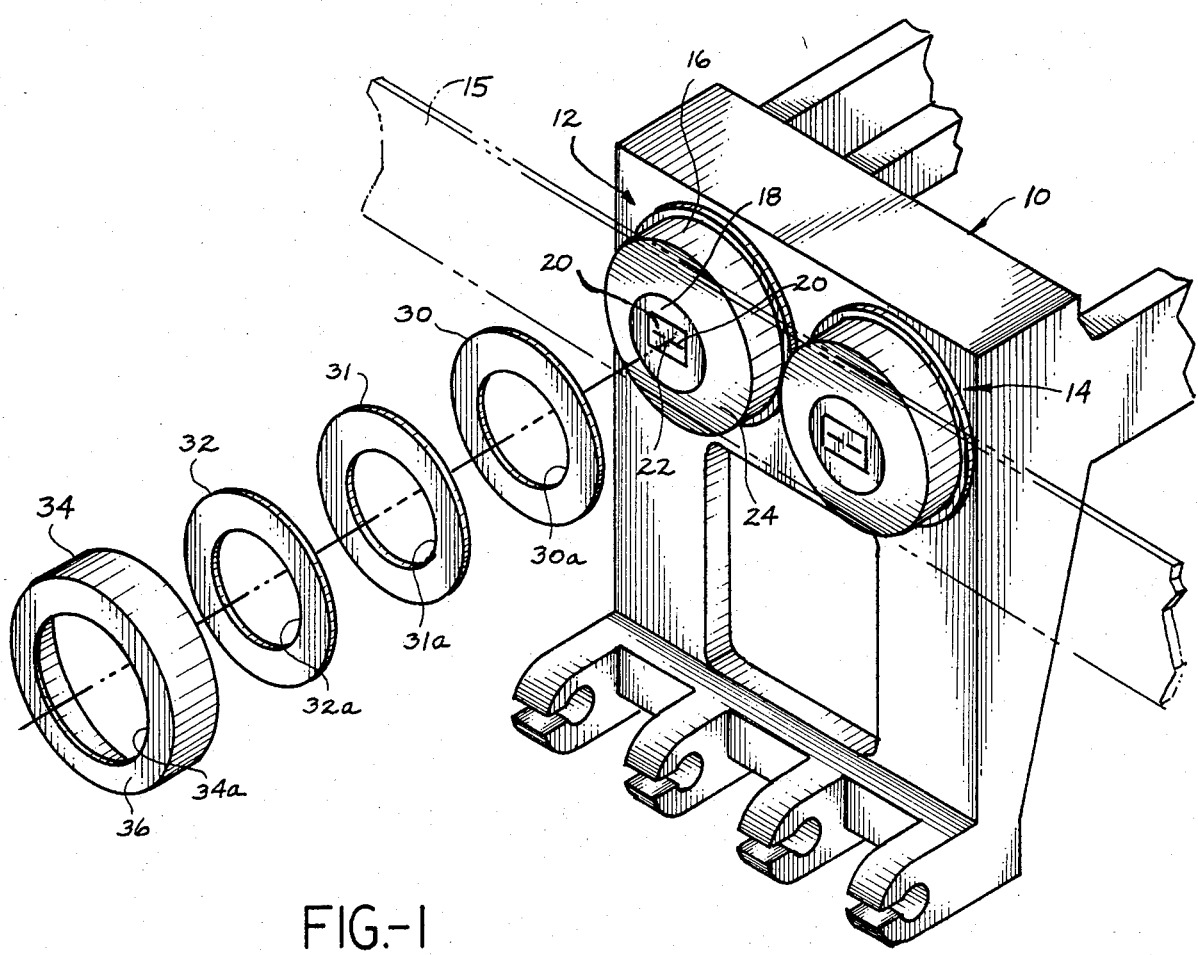
FIG. 1 is an exploded, perspective view of a portion of a head support mechanism showing the details of a shielding arrangement pursuant to the invention.

With reference to the drawings, a head carriage 10 includes at one end thereof a pair of standard magnetic head assemblies 12 and 14 of the type commonly used in single-sided floppy disk drives.

The head assemblies are adapted to interact with a magnetic tape 15 drawn past the head assemblies. The magnetic tape, in accordance with a preferred embodiment, is ½-inch wide and as is well known will typically accommodate multiple, parallel data tracks.

The carriage, only a portion of which is shown, is displaceable vertically, that is, transversely with respect to the direction of tape movement, so that the head assemblies may be stepped from one track to another across the width of the tape. These aspects of the tape drive do not form part of the present invention and therefore are not shown, reference being made to the aforementioned application Ser. No. 386,048 for a detailed description thereof.

Since the head assemblies are identical, only the head assembly 12 will be described in detail. The assembly 12 has an outer surface 16, which may be generally cylindrical, and a circular apex 18 comprising a generally spherical surface. The apex 18 includes transducer pole faces 20 defining a read/write gap 22 and an annular concave surface 24, receding from the apex, joins the apex with the outer surface 16, all of these elements comprising standard features of this type of head assembly.

The head assemblies 12 and 14 are mounted with their read/write gaps in alignment along the direction of tape travel so that they both interact with the same track on the tape. To insure good compliance between the tape and the tape-engaging apex 18, a pair of pressure pads 26 are springloaded into engagement with the tape so that it is firmly held against the area of the apex surrounding and including the read/write gaps.

Either of the heads 12 or 14 can be selected for reading or writing. In normal streaming operation, the head selected for writing is based on tape direction so that reading can always occur after writing. That is, with respect to the direction of tape travel, the write head is the leading head, while the read head is the trailing head. In this manner, data can be read and checked for accuracy immediately after it is written. However, because of the close proximity of the horizontally spaced head assemblies 12 and 14, interhead shielding must be provided to reduce to a minimum crosstalk between the heads due to magnetic coupling during read-afterwrite write operations.

It has been found that in the described head assembly structure an asymmetrical arrangement in which only one of the head assemblies is shielded provides an optimum reduction of crosstalk. It has been determined that crosstalk is not decreased to an acceptable level with arrangements in which both heads are shielded.

Figure 2:
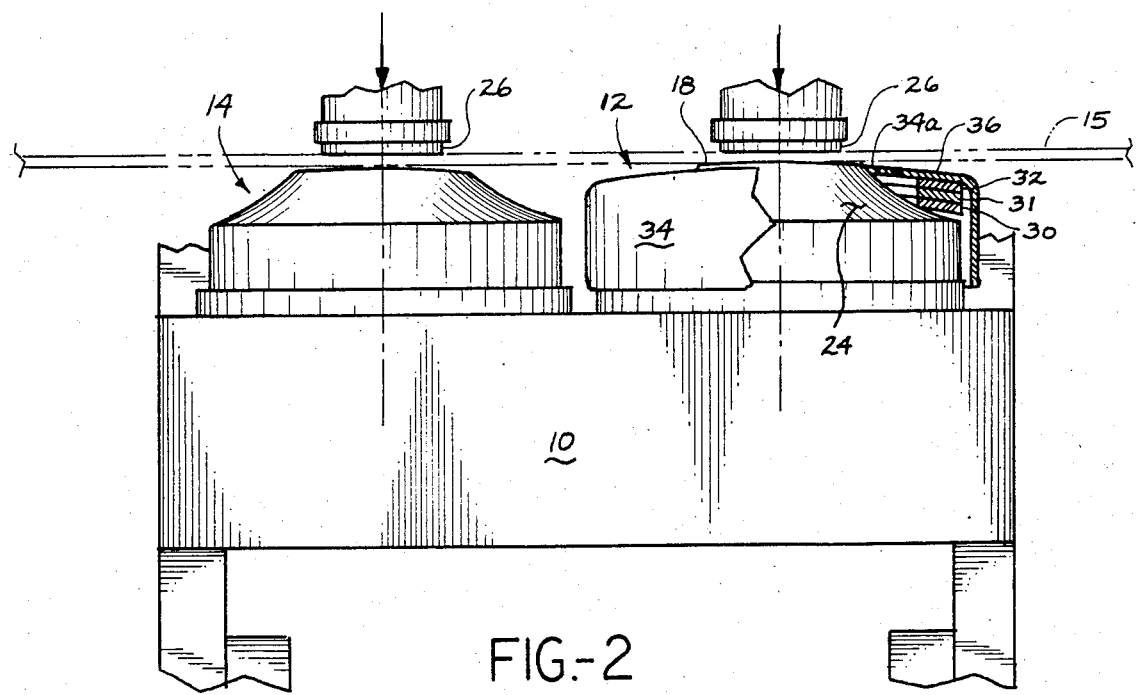
FIG. 2 is a plan view partly in section, of the head support mechanism of FIG. 1.

The shielding structure of the present invention, which structure may be associated with either of the heads 12 or 14 but is shown by way of example on the head 12, includes a pair of thin washers 30 and 32 of high magnetic permeability material such as mu-metal sandwiching a thin washer 31 of substantially non-magnetic, electrically conductive material such as copper. The stacked washers 30–32, which may each have a thickness of 0.002 inch, are retained by a copper plated, mu-metal cap 34 within the space defined by the concave surface 24 of the head assembly 12, as best seen in FIG. 2. The cap has a generally cylindrical configuration with a somewhat convex front annular face 36. The washers, which lie generally parallel to the plane of the tape, include central openings 30a, 31a and 32a, respectively, in alignment with a central aperture 34a in the cap.

The washers and the annular face of the cap surround the apex 18 which projects from the cap a small distance, for example, 0.025 inch, so as to preclude contact between the tape and the cap.

While there has been shown and described what is considered a preferred embodiment of the invention, it will be apparent to those skilled in the art that various changes and modifications may be made therein without departing from the spirit and scope of the invention as defined by the appended claims.

What is claimed is:

1. An apparatus for effecting data recording and reproducing in relation to a movable magnetic medium, the apparatus including:
   a pair of identical, magnetic read/write head assemblies, each assembly including means defining a read/write gap;
   means for supporting the head assemblies in spaced-apart relationship along the direction of motion of the magnetic medium; and
   magnetic shielding mounted on one of the heads, said shielding circumscribing the gap-defining means and including a substantially non-magnetic, electrically conductive shield element sandwiched between a pair of high magnetic permeability elements;
   the electrically conductive shield element being copper and the high magnetic permeability elements being made of mu-metal, the shield elements being stacked washers with their holes aligned and through which holes the gap-defining means projects for data transfer relationship with said magnetic medium.

2. An apparatus, as defined in claim 1, in which:
   the head assembly is of generally cylindrical configuration having an apex portion including the gap-defining means and a generally annular relieved portion surrounding the apex, said washer shield elements being mounted in said annular relieved portion;
   and which includes:
   a generally cylindrical, copper plated, mu-metal cap housing said shield elements, said cap including a central aperture in alignment with the holes in the shield elements.

3. A shielded magnetic read/write head assembly for use with a magnetic medium, the assembly comprising:
   a magnetic head having an outer, generally cylindrical surface, an apex including means defining a read/write gap, and a generally concave, annular surface receding from the apex and joining the apex and the outer surface;
   a series of shield elements stacked within the confines of the concave surface, the elements including a pair of mu-metal washers sandwiching a copper washer; and
   a copper plated mu-metal cap enclosing the shield elements, the cap having a front face defining a central opening in alignment with the openings in the washer shield elements, the apex of the head projecting through the central opening in the cap for cooperation with the magnetic medium.

4. Apparatus, as defined in claim 3, in which:
   the head assembly includes a second magnetic head substantially identical to and disposed adjacent the first-mentioned magnetic head.

5. A crosstalk shielding assembly for addition to a read/write magnetic head comprising the combination of:
   a stack of washers of like size and of different material composition;
   a cap of generally cylindrical configuration and having an annular face at one side thereof, the stack of washers being generally concentrically disposed within and against the annular face of the cap; and
   the stack of washers being comprised of a first washer of substantially non-magnetic, electrically conductive material sandwiched between second and third washers of high magnetic permeability material, and the cap being of relatively high magnetic permeability material.

6. Apparatus, as defined in claim 5, in which:
   the first washer is made of copper, the second and third washers are made of mu-metal, and the cap is made of copper plated mu-metal.

7. An apparatus for effecting data recording and reproducing in relation to a moveable magnetic medium, the apparatus including:
   a pair of substantially identical magnetic read/write head assemblies, each of the head assemblies having a read/write gap at an apex thereof;
   means for supporting the head assemblies in spaced-apart relation along the direction of motion of the magnetic medium;
   a crosstalk shielding assembly mounted on one of the head assemblies and including a stack of ring-shaped elements disposed against the head assembly so as to encircle the read/write gap in the region of the apex, and a cap member of generally cylindrical configuration mounted on the head assembly and containing the stack of ring-shaped elements therein; and
   the stack of ring-shaped elements being comprised of a first washer of substantially non-magnetic, electrically conductive material sandwiched between second and third washers of high magnetic permeability material, and the cap member being of relatively high magnetic permeability material.

8. Apparatus, as defined in claim 7, in which:
   the first washer is made of copper, the second and third washers are made of mu-metal, and the cap member is made of copper plated mu-metal.

9. Apparatus, as defined in claim 7, in which:
   each of the pair of substantially identical magnetic read/write head assemblies is a floppy disk drive head assembly having a button-like apex.

* * * * *